Nov. 12, 1929.  J. B. KILBURN  1,735,321
CAR SEAT
Filed July 2, 1926  6 Sheets-Sheet 4
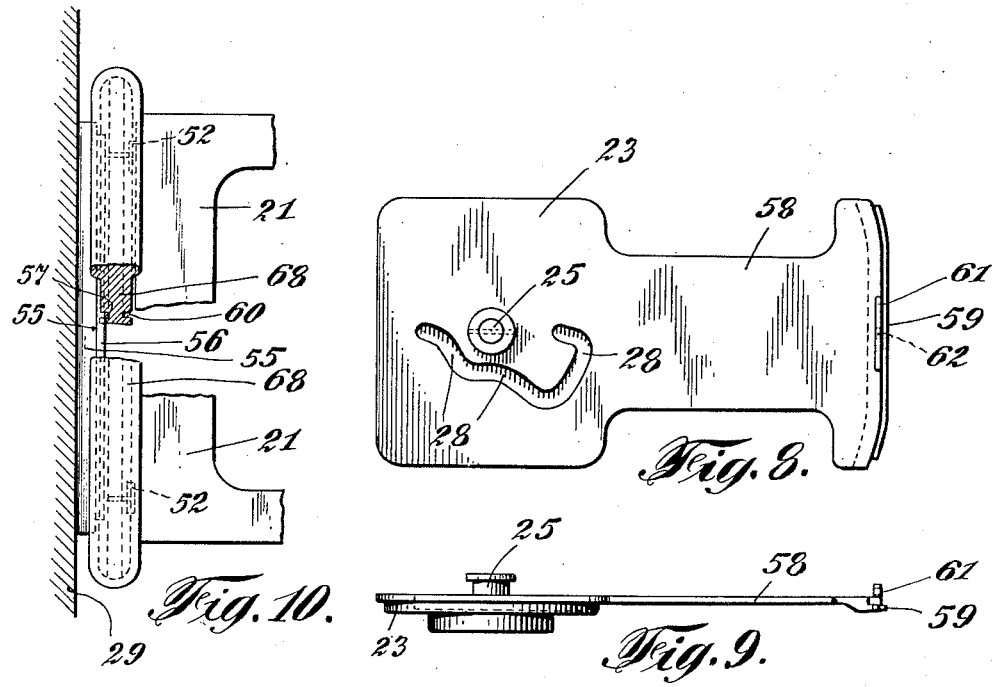
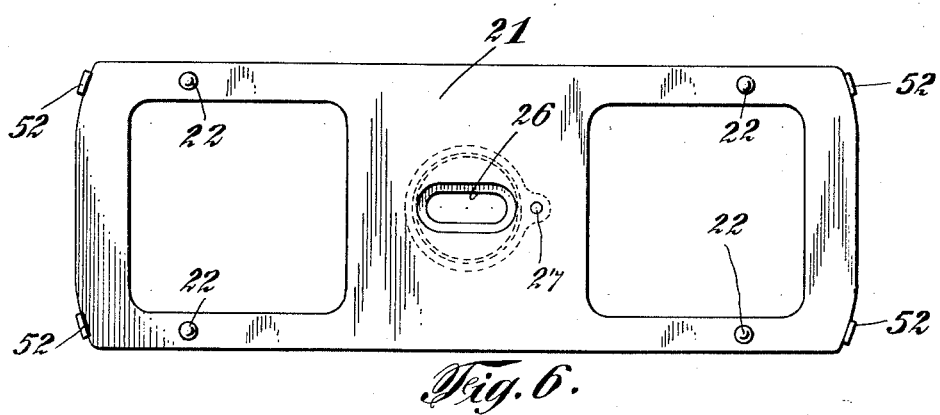
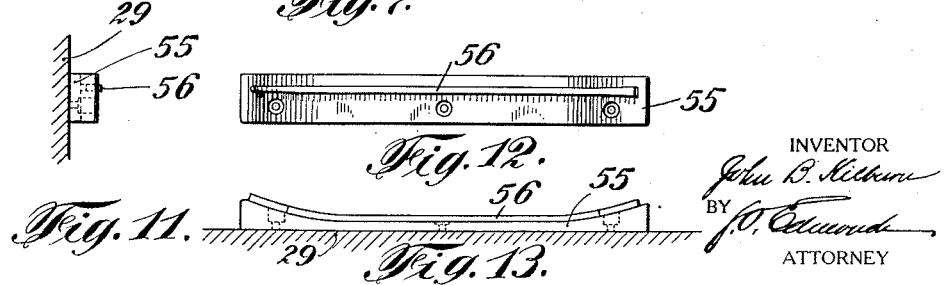
INVENTOR
John B. Kilburn
BY
ATTORNEY

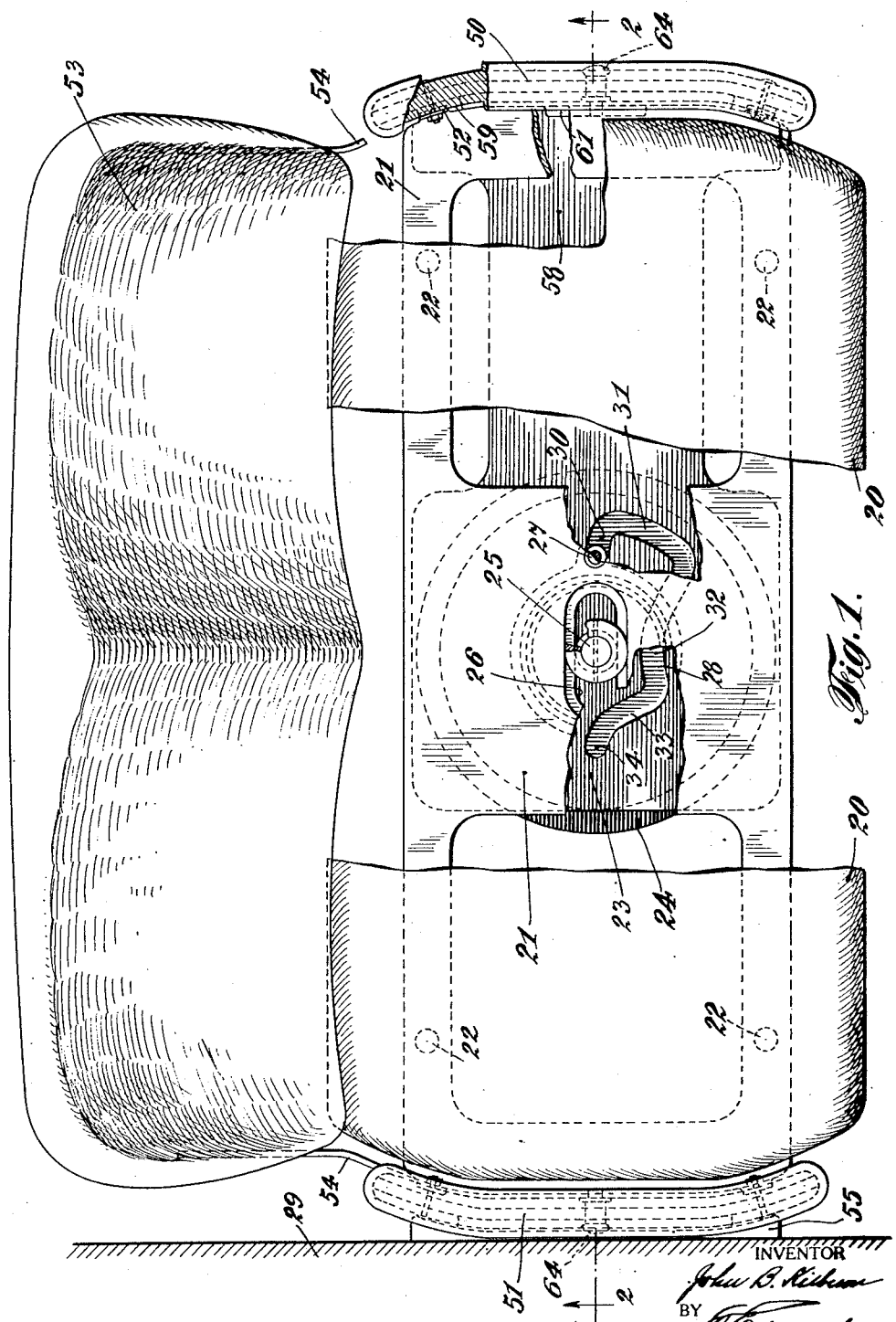

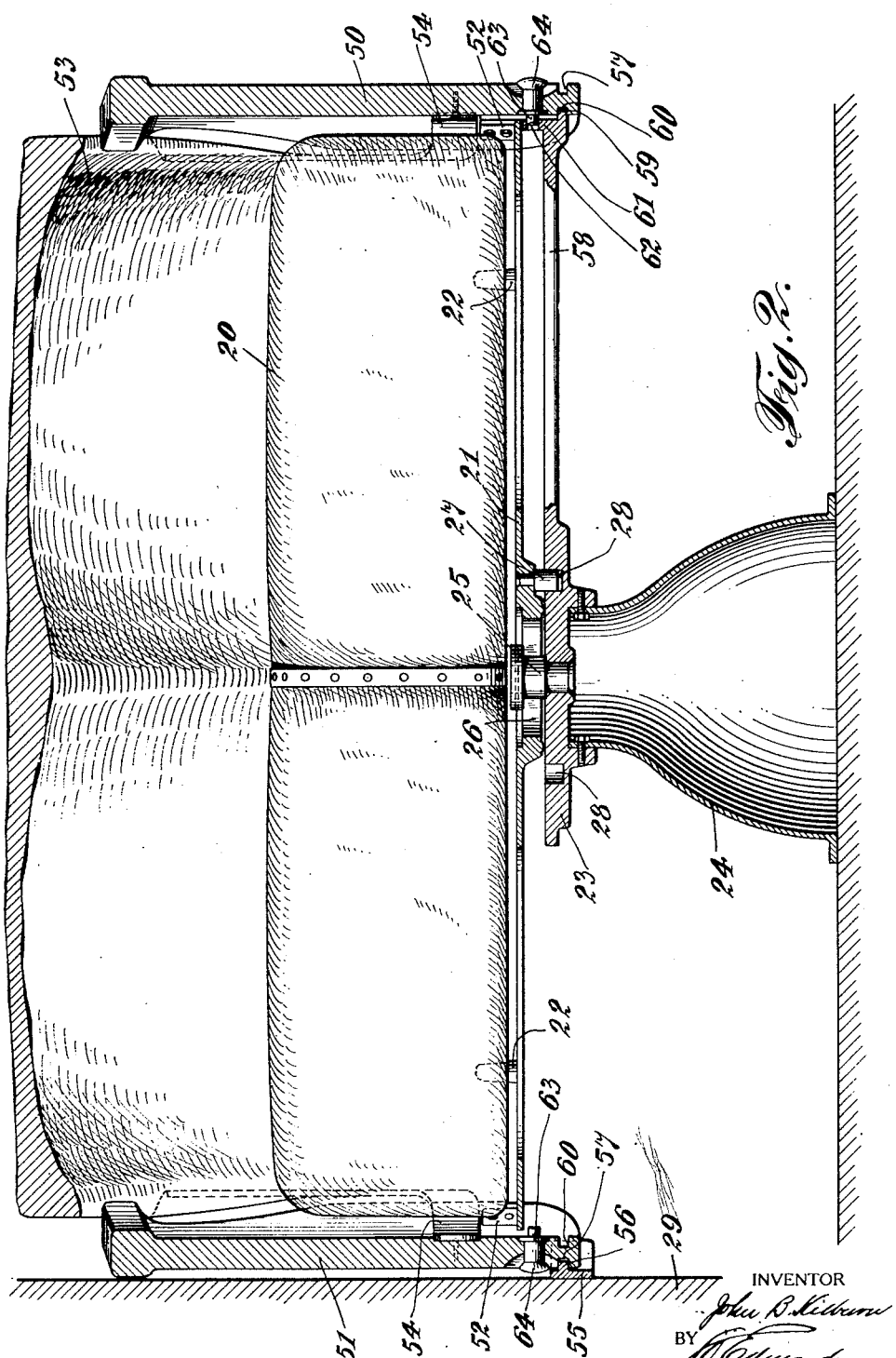

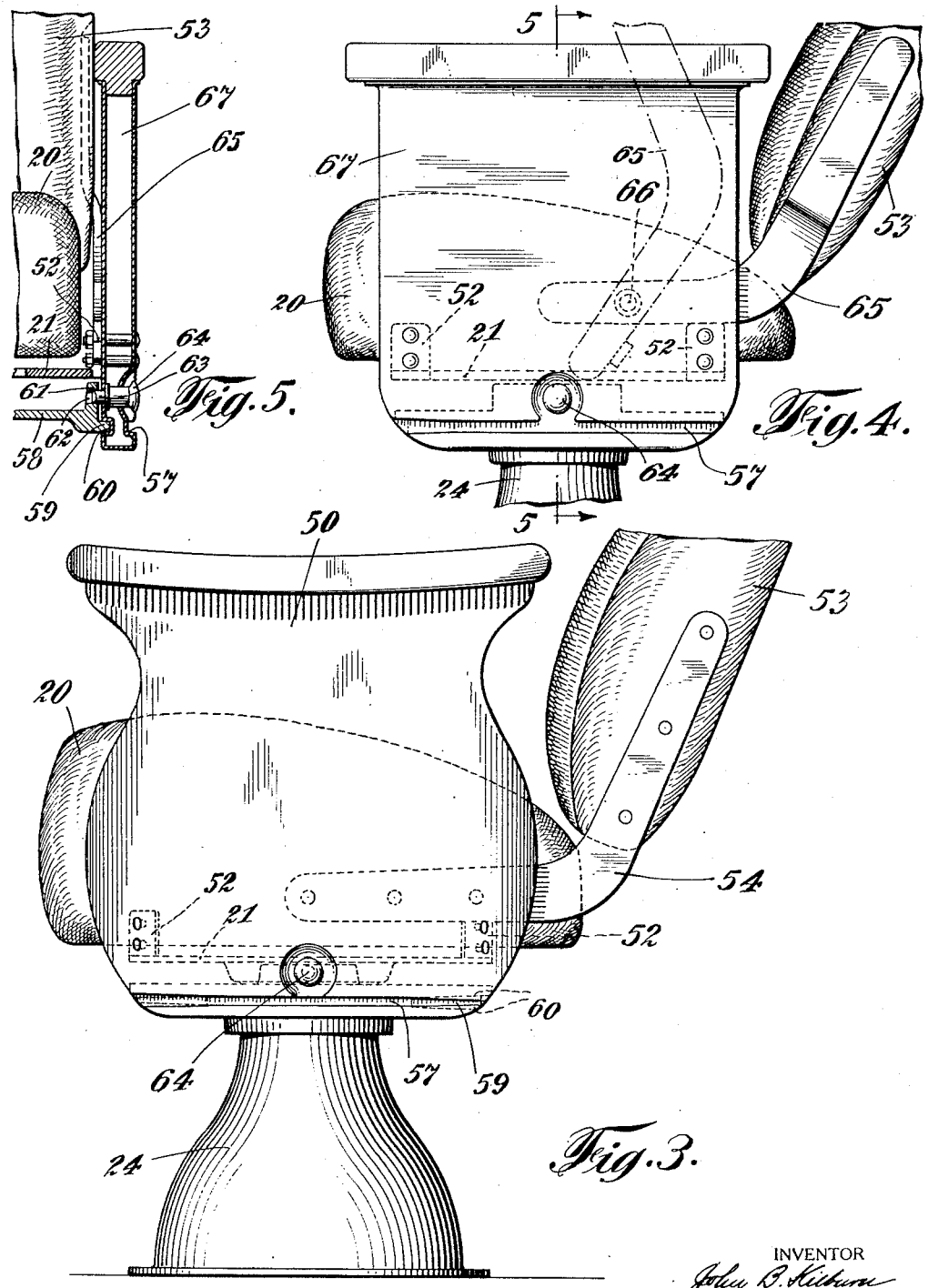

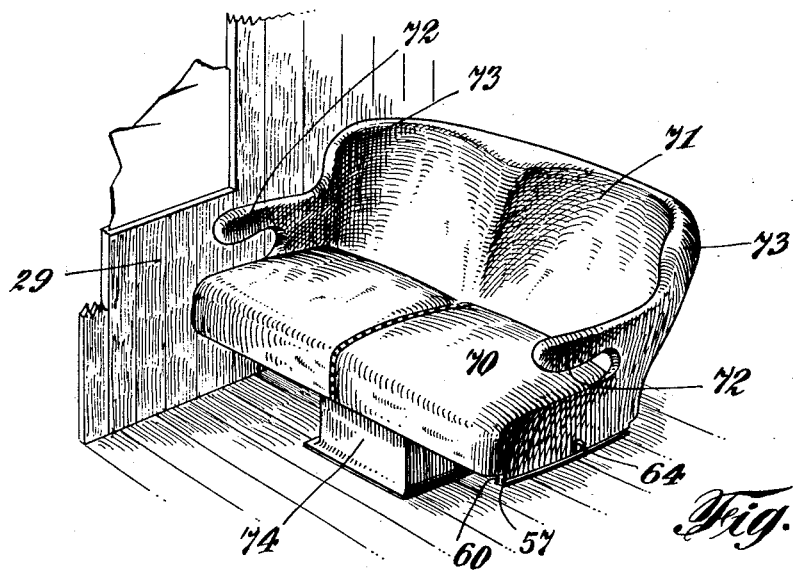
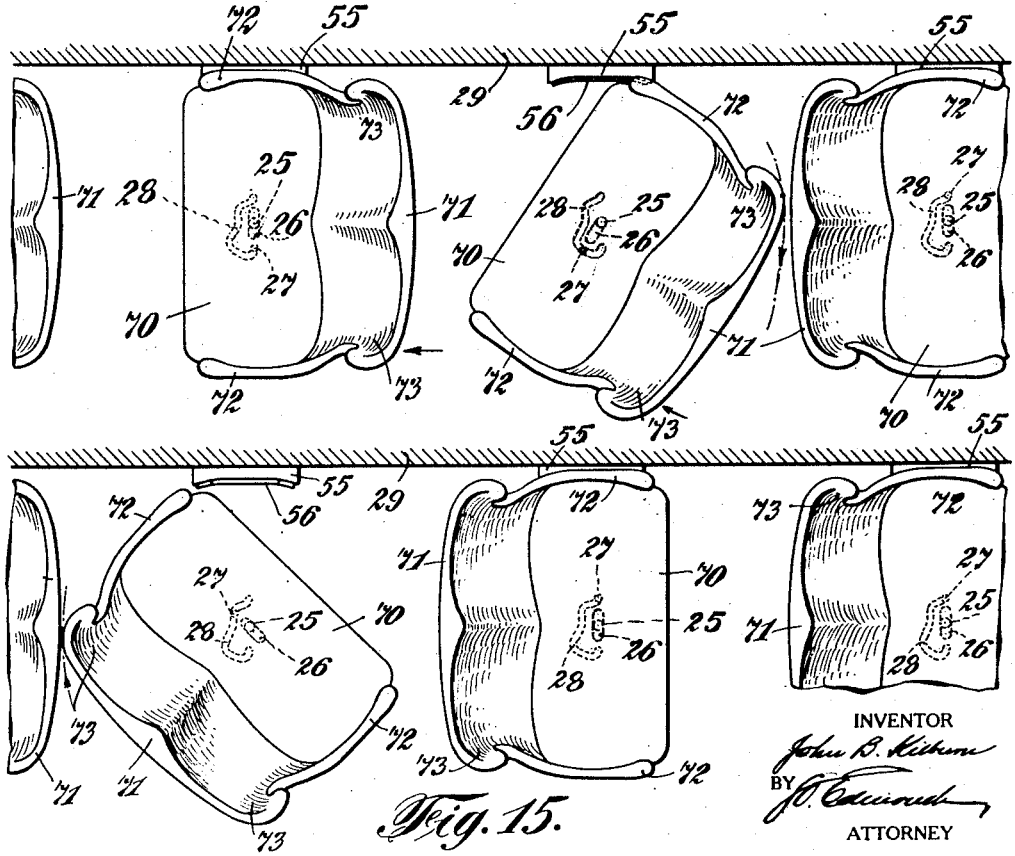

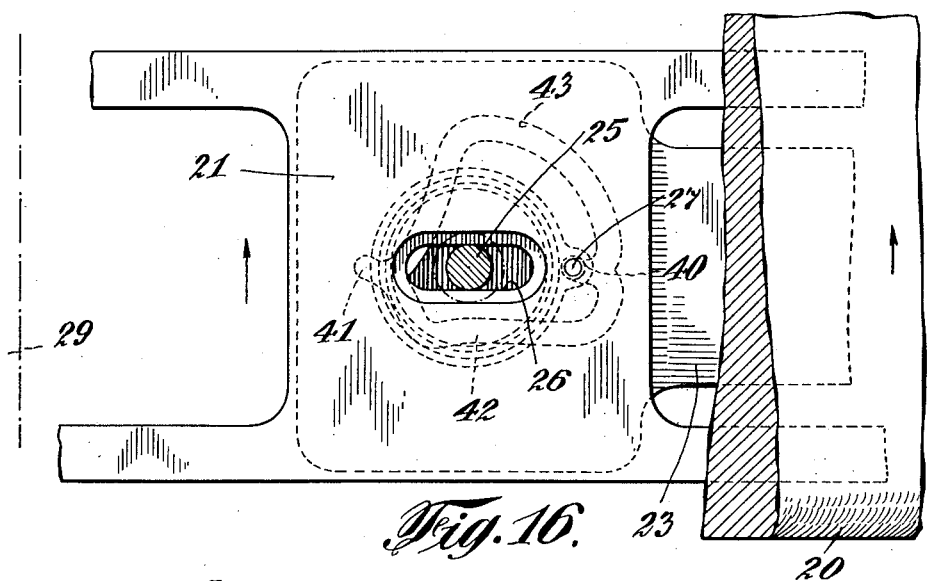
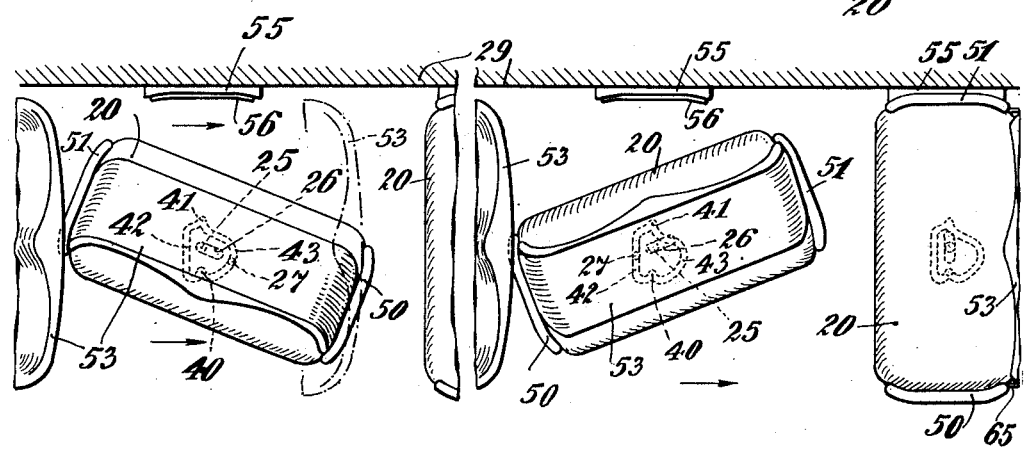
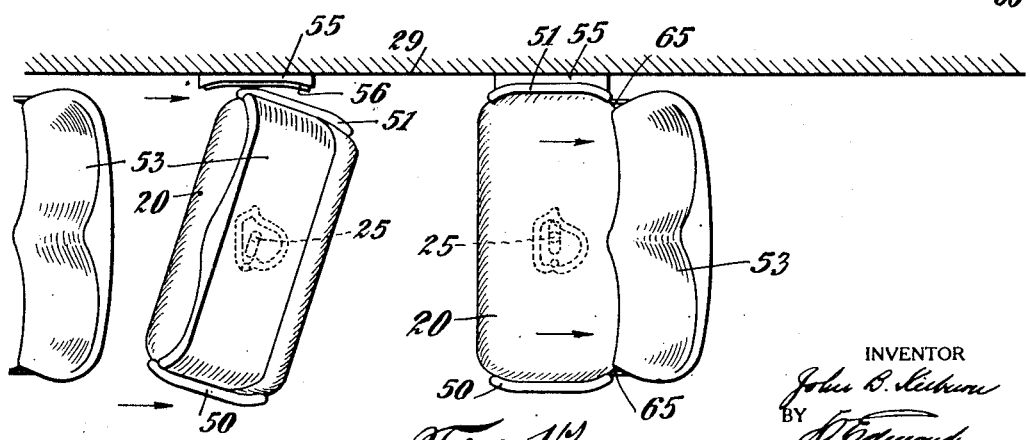

Patented Nov. 12, 1929

1,735,321

UNITED STATES PATENT OFFICE

JOHN B. KILBURN, OF OCEAN CITY, NEW JERSEY

CAR SEAT

Application filed July 2, 1926. Serial No. 120,080.

This invention relates to car seats, and more particularly relates to seats for railway and tram coaches as distinguished from parlor cars, club cars, observation cars, and the like, and relates to seats which may be revolved in a horizontal plane to face toward either end of the coach.

The most salient problems to be met in this art include providing a coach with seating accommodation for a maximum number of passengers; making the seats comfortable, steady and sturdy; arranging them so that they may be faced toward either end of the car, since most passengers object to riding backwards; arranging for the easy and convenient reversal of the seats by the trainmen; and providing seats which have an appearance creating an impression of attractiveness, comfortableness, and security.

In order not to lessen the seating capacity of a coach below the normal (72 to 80 passengers per coach), each seat must be confined to a small space and the seats must be placed close to each other. Preferably each seat accommodates two passengers.

The ease and comfort of the seat depends to a great extent on the depth of the springs and upholstery and the pitch of both the cushion and the back. To obtain maximum ease and comfort, the cushion and seat back must remain relatively in the same position, whichever way the seat is facing.

The most popular type of seats has been adapted to accommodate two passengers and to be reversed by moving the seat back over the seat cushion from one side to the other, with the accompanying movement of the seat cushion in a reverse direction to the movement of the seat back. Also, some coaches have been equipped with stationary seats not adapted for reversal. Reversible seats of the type referred to have been lacking in comfort, since the backward and forward movement of the back over the cushion precludes their being equipped with deep and luxurious upholstery. These seats necessarily require comparatively thin cushions and thin backs, and the spring and upholstery space is so limited that a very comfortable seat cannot be made without making the seat so large that it will objectionably limit the number of seats per coach.

Stationary seats have permitted deep and luxurious upholstery, but have forced the occupant to ride backwards when the coach is traveling one way.

The ordinary parlor car chairs revolve in a horizontal plane and have deep and comfortable upholstery, but these take up a great deal of space, permitting usually no more than twenty-five single seats per car, as compared with seventy-two to eighty seats in the ordinary passenger coach.

Accordingly, it is apparent that each type of seat referred to has serious limitations and objections. The reversible seats lack comfort comparable to the parlor car chair. The parlor car chair limits the seating capacity much below that obtainable with reversible or stationary seats. Stationary seats cannot be faced in either direction to correspond with the direction in which the coach is moving.

The principal object of my invention is to provide a seat for railway and tram coaches, and the like, which overcomes the above noted objectionable features of reversible coach seats, parlor car seats and stationary coach seats, and at the same time to provide a coach seat which meets the problems above mentioned in a satisfactory and efficient manner. In short, the principal object of my invention is to provide a coach seat which embodies greater ease and comfort than any heretofore produced, and at the same time conserves seating space to the utmost, and permits facing in different directions.

A further object of my invention is to provide a coach seat of the character described, which is simple, sturdy and durable in construction, and easy to install in a railway coach, tram car, or the like, and easy to revolve.

Other objects of my invention will be in part obvious and in part pointed out hereinafter.

In accordance with my invention, my seat is of such construction that it will accommodate two passengers comfortably and will occupy so little space in the coach that comfortable seating accommodations may be provided in the ordinary passenger coach for the usual number of passengers, that is, seventy-two to eighty. At the same time, to retain great depth of springs and upholstery and comfortable pitch for both cushion and back when the seats are mounted close enough together to accommodate the usual number of passengers in a coach, the seat is not of the reversible type, but revolves instead, and to permit of this revolution to change the facing direction of the seat without requiring much space, it is advisable to make some arrangement for avoiding interference with an adjacent seat and with the car wall, due to the width of the cushion or the overhang of the top edge of the back due to its pitch or inclination. To avoid such interference, I propose to mount the seat on a pivot which shifts both away from the car wall and also away from an adjacent seat as the seat is revolved to face in the opposite direction. The seat may be provided with a seat back, which may be tilted over the seat cushion to reduce the amount of shifting required to avoid the interference above mentioned, without requiring too great amount of shifting of the seat. If desired, however, the seat back may be rigidly fixed relatively to the seat cushion.

The seat may be supported for revolution either on a central pedestal or on cross rails, secured at one end to the car wall or to a pedestal thereat, and at the other end to a pedestal at the aisle end of the seat.

Preferably, locking means are provided, which prevent the seat from being revolved after it has been turned to face either end of the car.

When a central pedestal is employed, means are preferably provided for supporting the ends of the seat when fully turned to steady the seat and prevent teetering.

The seat may have arm rests or not, as desired, and when provided, the arm rests are secured to the seat for revolution therewith.

The seat may be arranged to revolve back and forth over an arc of 180°, or may be arranged to revolve in a complete circle.

In order that a clearer understanding of my invention may be had, attention is hereby directed to the accompanying drawings, forming a part of this application and illustrating certain possible embodiments of my invention.

Referring to the drawings:

Fig. 1 is a top view of a seat embodying my invention, partly broken away, and showing the location of various parts in dotted lines to more clearly bring out the construction;

Fig. 2 is a vertical longitudinal sectional view of the seat, and is taken on the line 2—2 of Fig. 1;

Fig. 3 is an end view of the same, a part of the seat back being broken away;

Fig. 4 is a view similar to Fig. 3, but showing a tiltable back and a steel seat end;

Fig. 5 is a sectional view of the same, and is taken on the line 5—5 of Fig. 4;

Fig. 6 is a top plan view of the cushion rest;

Fig. 7 is a side view thereof;

Fig. 8 is a top plan view of the supporting frame, on which the cushion rest revolves;

Fig. 9 is a side view thereof;

Fig. 10 is a top view, partly in section and partly broken away, showing an end of the construction against the car wall;

Fig. 11 is an end view of the wedge plate mounted on the car wall;

Fig. 12 is a front view of the same;

Fig. 13 is a top view of the same;

Fig. 14 is a perspective view of a seat having a fixed back and embodying my invention;

Fig. 15 is a diagrammatical view, showing two lines of car seats, the seats facing in different directions and two of them being partially rotated;

Fig. 16 is an enlarged top plan view of a fragment of a modified construction permitting 360° revolution of the seat, the view including a fragment of the cushion, cushion rest and supporting frame; and Fig. 17 is a diagrammatical view, showing two lines of car seats embodying the above modification and of the type having backs which tilt with respect to the cushion, some of the seats being in partially revolved position.

Similar reference characters refer to similar parts throughout the several views of the drawings.

Referring to the drawings, the seat cushion 20 is supported on a cushion rest 21, which has dowel pins 22 engaging the cushion, so that the cushion and cushion rest revolve together. The cushion rest at its center rests on a frame 23, which is supported on a central pedestal 24, or may be supported on cross rails extending between the car wall 29, or a pedestal thereat, and another pedestal at the aisle end of the seat. The cushion rest and frame are provided with interengaging pins and slots, whereby the seat may be revolved on the frame 23 and at the same time be caused to move bodily away from the car wall and an adjacent seat, to prevent interference between the corners of the seat and the top of the seat back with these adjacent parts.

In one modification shown (Figs. 1 and 2), the main pivot pin 25 is fixed to the frame 23 and seats in the slot 26 in the cushion rest 21.

A cam pin 27 is secured to the cushion rest 21 and seats in a cam slot 28 formed in the frame 23. In either fully reversed position of the seat, the slot 26 is disposed at right angles to the car wall 29, and the slot 28 extends halfway about the slot across a side thereof. The shape and curves of the slot 28 are fashioned in accordance with the particular dimensions and characteristics of the seat, and to the amount and extent of movement which it is desired to give the seat away from the car wall and from an adjacent seat.

In the form of slot illustrated in Figs. 1, 2 and 15, the movement of the seat in turning will be as follows: When the seat is in the position shown in Fig. 1 of the drawings, the pin 27 is at one end of the slot. This end 30 of the slot extends toward the car wall, so that at the start of the seat's rotation, the pin 27 will be cammed outwardly from the car wall and give a similar translatory motion to the seat. The contour of the slot then follows somewhat concentrically about the pin 25, so that the seat will turn for a distance while held out from the car wall. This portion of the slot is designated 31. From this portion of the slot, the pin 27 will enter a reversely curved portion 32, which will cause the seat to move away from an adjacent seat, during the extent of rotation which takes the pin 27 through this portion of the slot. Further rotation of the seat will take the pin 27 through a portion 33 of the slot, which takes the seat back again toward the adjacent seat, and finally the pin 27 enters the opposite end 34 of the slot which extends toward the car wall, so that when the seat arrives in final position of revolution, it will be taken back again close to the car wall. The play of the cushion rest toward and away from the car wall and the adjacent seat is permitted by reason of the pin 25 engaging in the slot 26 in the cushion rest, which slot revolves therewith. The different positions of the seat are diagrammatically illustrated in Fig. 15. When the seat is to be turned back again, the pin 27 traverses the slot 28 in the opposite direction, but the seat will undergo the same sort of movement as before.

If it is desired that the seat may be rotated a full circle instead of only 180° back and forth, the slot is extended entirely about the pin and slot 26, as illustrated in Figs. 16 and 17. Here, again, it is intended that the shape and curvature of the slot be modified in accordance with the particular dimensions and characteristics of the seat construction, and in accordance with the amount of movement desired from the car wall and from an adjacent seat. In the modification referred to, the slot is adapted to move the seat away from the wall and in one direction along the car, irrespective of which way the seat is revolved. In these figures, the car wall is represented at 29, and the desired movement along the car is indicated by the arrows applied to these figures. In this instance, the contour of the slot follows somewhat the outline of a distorted heart, having portions 40 and 41 at opposite sides of the pin 25, which cause the seat to move away from the wall 29 on initial rotation of the seat, and which cause the seat to move against the wall 29 as the seat reaches fully revolved position from either direction. The slot curves between these end portions on opposite sides of the pin 25. On the side toward the adjacent seat, away from which movement is desired, the slot is curved inwardly toward the pin 25, as at 42, so that the coaction of the pin 27 in this portion of the slot will cause the seat to be moved away from the said adjacent seat on revolution of the seat in question in either direction. On the opposite side of pin 25, the slot is further away from the pin 25 than the end portions 40 and 41 thereof. The curvature of this portion 43 of the slot is such that when the pin 27 travels therethrough the seat is drawn away from the same adjacent seat sufficiently to avoid interference therewith.

From the above, it will be readily apparent that by providing a seat which not only moves away from the car wall, but also from an adjacent seat, when it is revolved to reverse its direction of facing, deeper and more comfortable cushions may be provided, and also more depth and pitch of seat back provided, without sacrificing seating space.

The seat may take various forms. For instance (Figs. 1, 2 and 3), end plates 50 and 51 may be secured to opposite ends of the seat rest 21, as by being bolted to projections 52 formed thereon. The seat back 53 may be rigidly fixed to these seat ends by means of angular back standards 54, to steady the seat and to prevent teetering, a well as to take the strain from the center parts thereof. A plate 55 may be secured to the car wall 29, and may have a wedge-shaped projection or lip 56, which is engaged in a similarly shaped groove or recess 57 formed on the outside of each end plate 50 and 51. The frame 23 has an extension 58 extending toward the aisle, and presents an outward tapered lip or projection 59, which is engaged in a complementary recess 60 formed in each end plate, so that whichever end of the seat is toward the aisle will be engaged on this projection 59 and will be supported thereon. Whichever end of the seat is at the wall will be supported on the projecting lip 56.

If the seat is to be revolved a complete circle in either direction, then the projecting lips 56 and 59 cannot be wedge-shaped, but must be of even width, and the grooves 57 and 60 in the seat ends must also be of even width.

It is advisable to provide means for locking the seat when in either final position against reversal. Such means may comprise a projection 61 formed on the extension 58 of the frame 23 at the aisle end, this projection having a recess or aperture 62, in which is engageable a latch 63, which is duplicated on each seat end 50 and 51. Each latch is preferably provided with a knob 64, whereby the latch may be manually disengaged from the recess 62 to release the seat for revolution. The construction of this latch may be similar to the construction disclosed and described in my copending application, filed on even date herewith, Serial No. 120,078 (Case A).

Instead of securing the back in rigid position with respect to the seat cushion, the back standards 65 may be pivoted to each seat end, as at 66 (Fig. 4). In this figure, a steel seat end 67 is shown instead of a wooden seat end.

If desired, the side edges of the seat ends may be curved inwardly, as shown in Fig. 1, to reduce the amount of outward movement from the car wall required to avoid interference therewith when the seat is revolved. This curvature of the seat ends is not essential, however, and they may be straight, if desired, as is the arm rest 68 shown in Fig. 10.

Fig. 14 illustrates still another type of seat which may be mounted for either movement above described. In this case, the seat cushion 70, seat back 71 and arm rests 72 are of integral construction. The seat back has wings 73 at each corner, to increase the comfort as a head rest. In this instance, a square pedestal 74 is shown instead of a round one. Obviously, in any of the seat constructions, the pedestals may assume any arbitrary form desired, or may be omitted completely, and the support for the seat secured at the ends of the seat instead of at the center.

Instead of having the main pin secured to the frame and the cam pin secured to the seat rest, both pins may be secured either to the cushion rest 21 or to the frame 23, with the slots in the opposite member, or the main pin may be secured to the cushion rest and the cam pin to the frame 23. For variations in the mounting of these pins, reference is made hereby to my copending applications, Serial Nos. 120,078 and 120,079 (Cases A and B), filed on even date herewith. These said copending applications also disclose various modifications of construction which are applicable to seats having the peculiar type of motion disclosed herein, that is, a motion away from and toward the car wall and away from and toward an adjacent seat when the seat is revolved to face in the reverse direction.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In a vehicle, the combination with a vehicle wall, of a supporting frame, a seat cushion, a cushion rest therefor rotatably mounted on said frame for horizontal reversal, means for shifting the cushion rest and cushion bodily on the support both away from the wall and longitudinally thereof as the rest and cushion are revolved to reverse the aspect of the seat, and means for confining the cushion rest against rocking movement on the supporting frame during the shifting and rotation of the cushion rest thereon.

2. In a vehicle, in combination, a stationary seat support, a seat cushion mounted on said support for complete horizontal revolution thereon in either direction, and means whereby the seat cushion when revolved to reverse its seating aspect is shifted bodily back and forth on the support irrespective of the direction in which the seat is revolved, said means including a cam track having a portion on one side of the center of the seat directed toward said center and having a diametrically opposite portion directed away from said center and having diametrically opposite intermediate portions, one disposed relatively close to the center of the seat and the other disposed relatively far therefrom, and a coacting member engaging in the cam track so as to follow the same.

3. In a car seat of the character described, in combination, a seat support, seating rotatably mounted on said support, grooved members secured to the seating at both ends thereof for rotation therewith, and stationary lip member at each end of the seat engageable interchangeably with said grooved members, whereby the seat is supported and steadied at both ends when in either of its reversible seating positions.

4. In a car seat of the character described, in combination, a seat support, seating rotatably mounted on said support, grooved members secured to the seating at both ends thereof for rotation therewith, and stationary lip members at each end of the seat engageable interchangeably with said grooved members, whereby the seat is supported and steadied at both ends when in either of its reversible seating positions, said grooves permitting entry of the lips from either end.

5. In a car seat of the character described, in combination, a supporting frame, a cushion rest rotatably mounted on the supporting frame, and latching means including stud members carried by said cushion rest, at each end thereof, telescoping interchangeably into a cooperating aperture in said supporting frame, for releasably securing said cushion rest against rotation.

6. In a car seat of the character described, in combination, a supporting frame, said frame having an extension portion, a cushion rest rotatably mounted on the supporting frame, a seat end secured to each end of the cushion rest for rotation therewith, and means for latching the seat cushion against rotation including a stud member carried by each seat end and engageable in a keeper recess therefor provided in said extension portion.

This specification signed this 21st day of June, 1926.

JOHN B. KILBURN.